United States Patent
Harvey

(10) Patent No.: US 12,434,815 B2
(45) Date of Patent: Oct. 7, 2025

(54) AIRCRAFT CONTROL SYSTEM

(71) Applicant: BBG Aerosystems Inc., Laytonsville, MD (US)

(72) Inventor: William Brandebury Harvey, Laytonsville, MD (US)

(73) Assignee: BBG Aerosystems, Inc., Laytonsville, MD (US)

( * ) Notice: Subject to any disclaimer, the term of this patent is extended or adjusted under 35 U.S.C. 154(b) by 0 days.

(21) Appl. No.: 18/822,911

(22) Filed: Sep. 3, 2024

(65) Prior Publication Data

US 2025/0074579 A1 Mar. 6, 2025

Related U.S. Application Data

(60) Provisional application No. 63/535,803, filed on Aug. 31, 2023.

(51) Int. Cl.
*B64C 13/50* (2006.01)
*B64C 3/40* (2006.01)
*B64C 3/56* (2006.01)

(52) U.S. Cl.
CPC ............... *B64C 13/50* (2013.01); *B64C 3/40* (2013.01); *B64C 3/56* (2013.01)

(58) Field of Classification Search
CPC ............ B64C 13/50; B64C 3/40; B64U 20/50
See application file for complete search history.

(56) References Cited

U.S. PATENT DOCUMENTS

| | | | |
|---|---|---|---|
| 3,606,978 A * | 9/1971 | Whitener | B64C 3/40 384/208 |
| 5,136,961 A * | 8/1992 | Follett | B63B 1/248 244/45 R |
| 5,671,899 A | 9/1997 | Nicholas | |
| 7,841,783 B2 | 11/2010 | Harvey | |
| 7,955,006 B1 | 6/2011 | Harvey | |
| 8,000,588 B1 | 8/2011 | Harvey | |
| 8,137,007 B1 | 3/2012 | Harvey | |
| 8,262,030 B2 | 9/2012 | Phillips | |
| 8,360,662 B1 | 1/2013 | Harvey | |
| 9,296,468 B1 | 3/2016 | Harvey et al. | |
| 9,975,624 B1 | 5/2018 | Harvey | |
| 2005/0269447 A1* | 12/2005 | Chronister | B64C 33/02 244/72 |
| 2020/0001982 A1* | 1/2020 | Utt | B64C 3/14 |
| 2020/0079492 A1* | 3/2020 | Noskowicz | B64U 10/25 |

(Continued)

FOREIGN PATENT DOCUMENTS

WO 2020010287 A1 1/2020

OTHER PUBLICATIONS

International Search Report filed in corresponding PCT Application US2024/044993 dated Dec. 3, 2024; 9 pages.

(Continued)

*Primary Examiner* — Rodney A Bonnette
(74) *Attorney, Agent, or Firm* — Rankin, Hill & Clark, LLP

(57) ABSTRACT

A control system for rotating an airfoil along one axis that is offset from a perpendicular axis that varies the angle of attack (AOA), dihedral, and center of lift based on the position of the attachment to precisely maneuver an aircraft. This technique can eliminate the need for traditional control surfaces such as ailerons, elevators, and rudders. allowing for an aerodynamically advantaged shape.

20 Claims, 14 Drawing Sheets

(56) References Cited

U.S. PATENT DOCUMENTS

2021/0354818 A1\* 11/2021 Hardarson ............. B64U 50/19
2021/0403143 A1   12/2021 Alley
2023/0159162 A1\*  5/2023 Narahara ................ B64C 3/385

OTHER PUBLICATIONS

Written Opinion filed in corresponding PCT Application US2024/044993 deted Dec. 3, 2024; 3 pages.

\* cited by examiner

Cruise

Roll Right

Roll Left

AIRCRAFT CONTROL SYSTEM

CROSS REFERENCE TO RELATED APPLICATIONS

This application claims the benefit under 35 U.S.C. § 119 of U.S. Provisional Application No. 63/535,803 filed Aug. 31, 2023. The contents of the aforementioned application is hereby incorporated by reference herein in its entirety.

TECHNICAL FIELD

The present disclosure relates generally to a control system for navigating vehicles such as aircraft, watercraft, and munitions.

BACKGROUND

Rotating wings fore and aft to change center of gravity (CG) and center of lift (CL) have existed for many years. Some aircraft with the addition of a controllable rudder have been flyable with wing sweep change.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein a control system for rotating an attachment for providing lift, such as for example an airfoil, wing, or hydrofoil along an axis that is offset from a perpendicular axis that varies the angle of attack (AOA), dihedral, and center of lift based on the position of the attachment to precisely maneuver a vehicle, such as an aircraft. Rotating the attachment in one direction increased lift and rotating the attachment in the opposite direction decreases the angle of attack.

In accordance with an example embodiment, there is disclosed herein a method for maneuvering a vehicle that comprises rotating a first attachment configured to provide lift (e.g., an airfoil, wing or hydrofoil) to the vehicle along an axis that is offset from a perpendicular axis of the frame to vary an angle of attack for the first attachment The method further comprises rotating second attachment configured to provide lift to the vehicle along the axis that is offset from the perpendicular axis of the vehicle to vary an angle of attack for the second attachment.

BRIEF DESCRIPTION OF THE DRAWINGS

The accompanying drawings incorporated herein and forming a part of the specification illustrate the example embodiments.

DESCRIPTION OF EXAMPLE EMBODIMENTS

Figure 1:
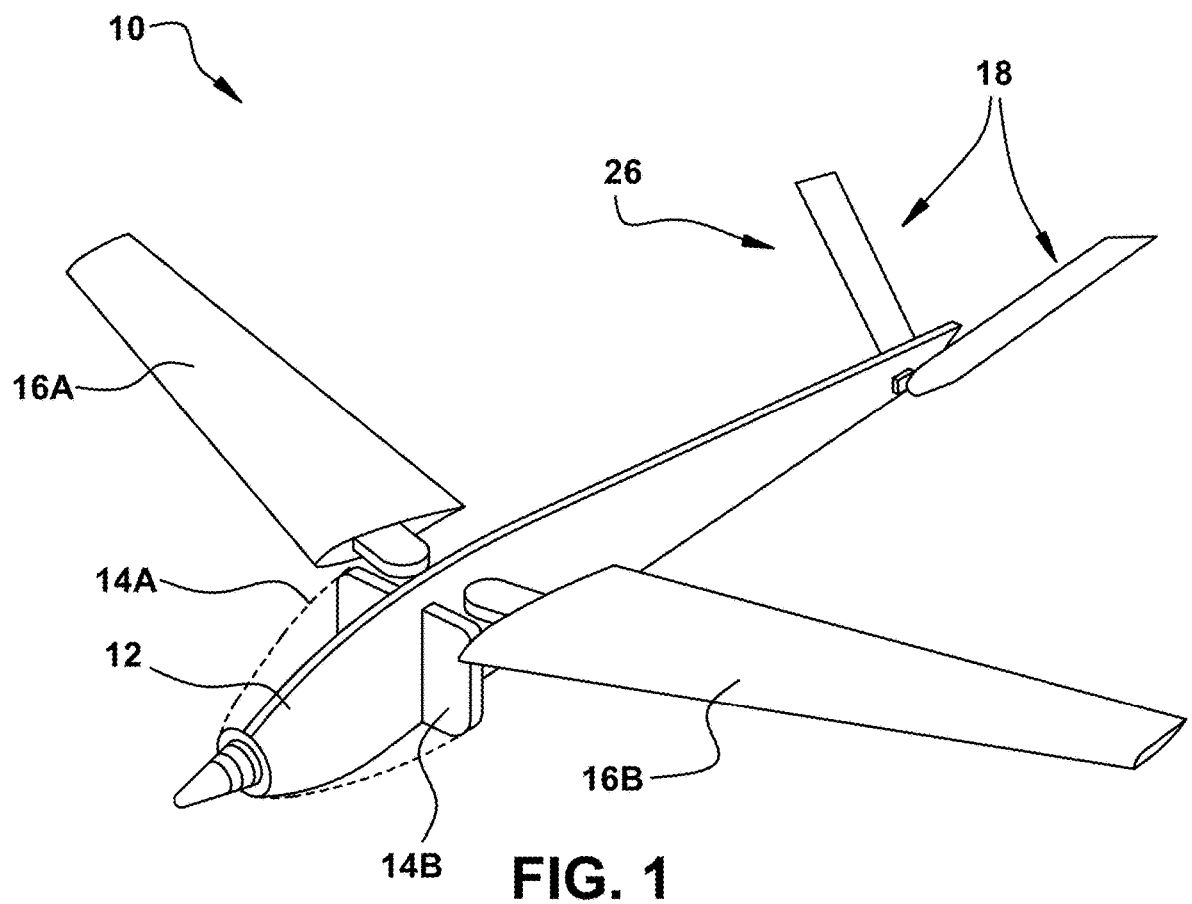
FIG. 1 is a perspective view of a vehicle upon which an example embodiment can be implemented.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

The illustrated examples described herein refer to an aircraft. This is merely for ease of illustration. Those skilled in the art can readily appreciate that the example embodiments described herein can be implemented on other types of vehicles, including but not limited to, for example, watercraft and munitions.

Described in an example embodiment herein is an aircraft control system that imparts control by changing the angle of attack (AOA) as a function of wing sweep position. The change can be made independently for the left and right wings. The amount and rates of change in the AOA is in proportion to wing position and offset of axis of rotation in relation to the direction of flight.

The aircraft is built around the design platform with a cruise wing sweep configuration for level flight between the extreme fore and aft wing positions. Sweep changes toward the front of the of the aircraft will increase the AOA and move the wing's center of lift forward and increase the load on the tailplanes. This induces a climb, allows the vehicle to flare upon landing or in more radical maneuvers may also stall the aircraft into a "perch" maneuver to slow or stop forward motion.

When the wings are swept to the rear, the AOA is decreased and the wing's center of lift moves rearward, decreasing the load on the tailplanes. This induces a dive.

When the wings are swept in opposing directions of equal amounts to initiate a turn, the AOA is reduced on the inside wing and increased on the outside wing with no change in aircraft's center of lift.

The wings can be swept forward while maintaining their relative offset to increase lift and maintain consistent altitude throughout the turn.

The wings may sweep by pivoting on individual axes or on a single axis. In an example embodiment, the wings can fold to a fully rearward, stowed position.

In practice, operation of the control system can produce flight characteristics, modes, and transitions identical to conventional moving flight surfaces when operating from a normal aircraft control transmitter.

FIG. 1 is a perspective view of a vehicle 10 upon which an example embodiment can be implemented. The vehicle comprises a frame 12. For an aircraft, the frame 12 may be referred to as a fuselage. For a watercraft, the frame 12 may be referred to the hull. In other applications, such as munitions the frame 12 may be referred to as an airframe, body, or any other suitable term. Extending from the frame 12 is a right protuberance 14A and a left protuberance 14B. Attachments 16A, 16B, such as wings, airfoils, hydrofoils, or other suitable surfaces for controlling lift, are coupled with the protuberances 14A, 14B respectively. In the illustrated example, the attachments are right wing 16A coupled with right protuberance 14A and left wing 16B coupled with left protuberance 14B.

As will be described in more detail herein, infra, a pivot extends from the protuberances 14A, 14B and offset at a non-zero angle from a perpendicular axis from the frame 12. The wings 16A, 16B have a wing root (which will be described herein, infra) that is rotatably mounted on the pivot. As will be described herein, infra, rotation of the wings 16A, 16B about the pivot causes a change in an angle of attack, and the dihedral and/or anhedral angle, of the wings 16A, 16B. Tailplanes 18 are located at the rear 26 of the frame 12.

in an example embodiment, the wings 16A, 16B are rotated (or swept) independently. As will be described herein, the example embodiments described herein allow for maneuvering of the vehicle 10 in three dimensions, e.g., up, down, left right (or roll, pitch, and yaw), without ailerons, an elevator, or a rudder.

Figure 2:
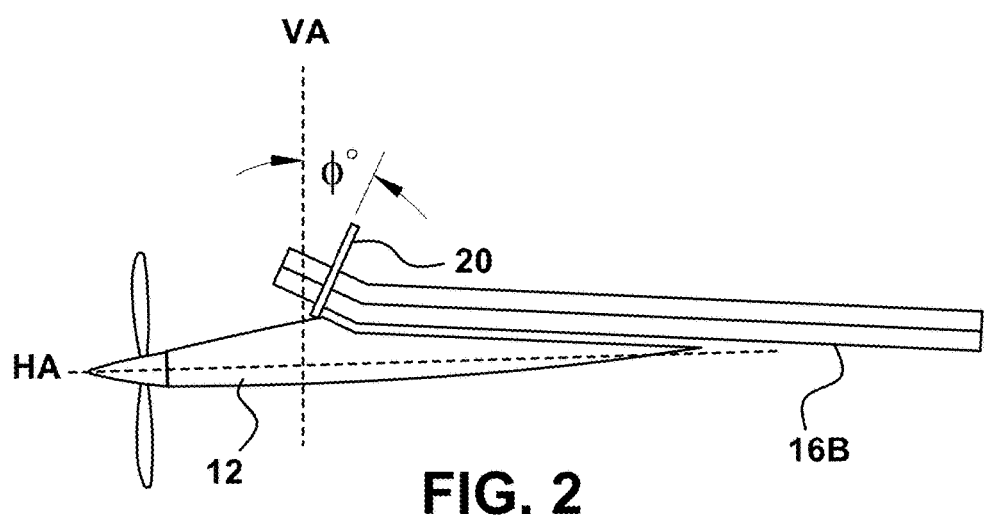
FIG. 2 is a perspective view of a wing mounted on a pivot in accordance with an example embodiment.

FIG. 2 is a perspective view of a wing 16 mounted on a pivot 20 in accordance with an example embodiment. Although the illustrated example is a perspective view of the left wing 16B, those skilled in the art can readily appreciate that in an example embodiment wing 16A is also mounted in a similar manner. The horizontal axis of the frame is illustrated by line HA and the vertical axis by line VA, which are used merely for illustration and are not part of the frame 12. The pivot 20 is offset by an angle φ from the vertical axis of the frame 12. The wing 16B rotates about the pivot 20, and because the pivot 20 is offset from the vertical axis of frame 12, this causes the angle of attack for wing 16B to vary based on the rotational orientation of wing 16B around the pivot 20.

Figure 3:
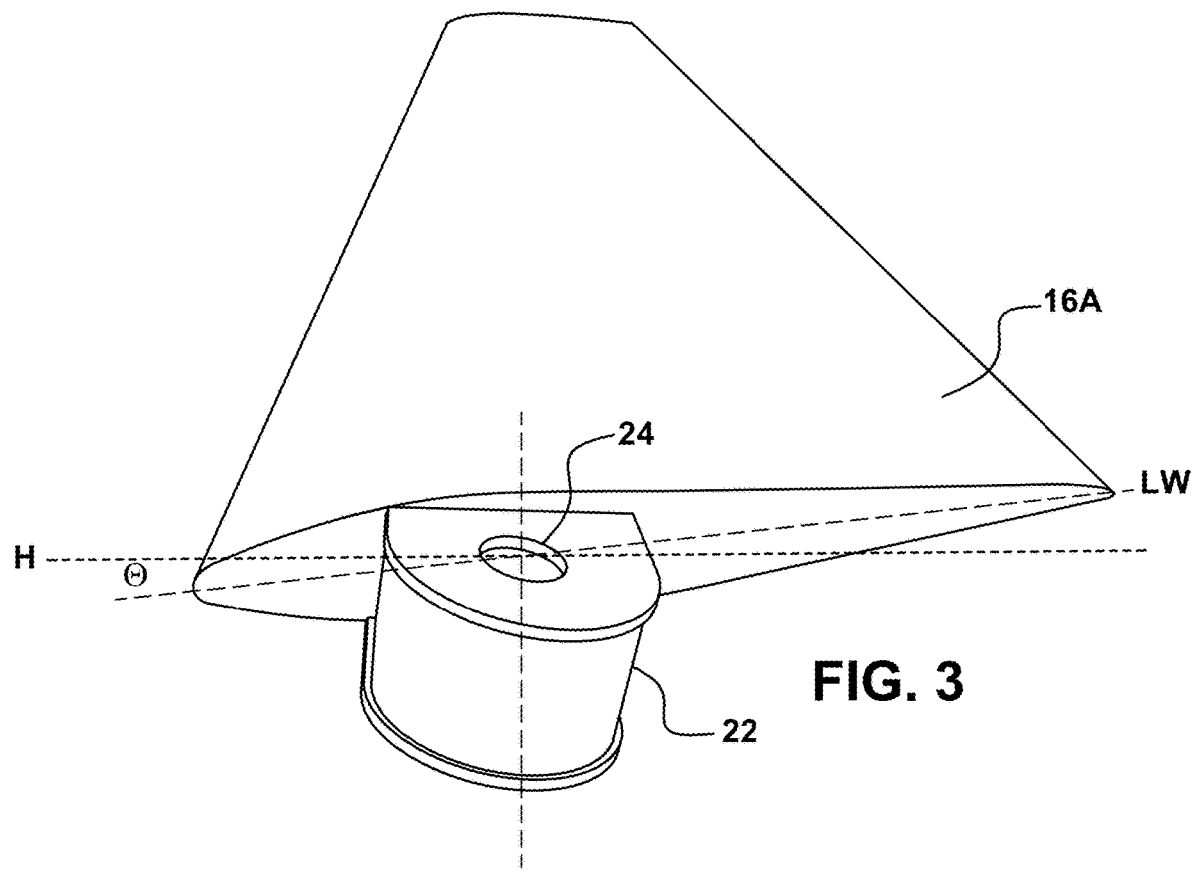
FIG. 3 is a perspective view of a wing configured in accordance with an example embodiment.
Figure 4:
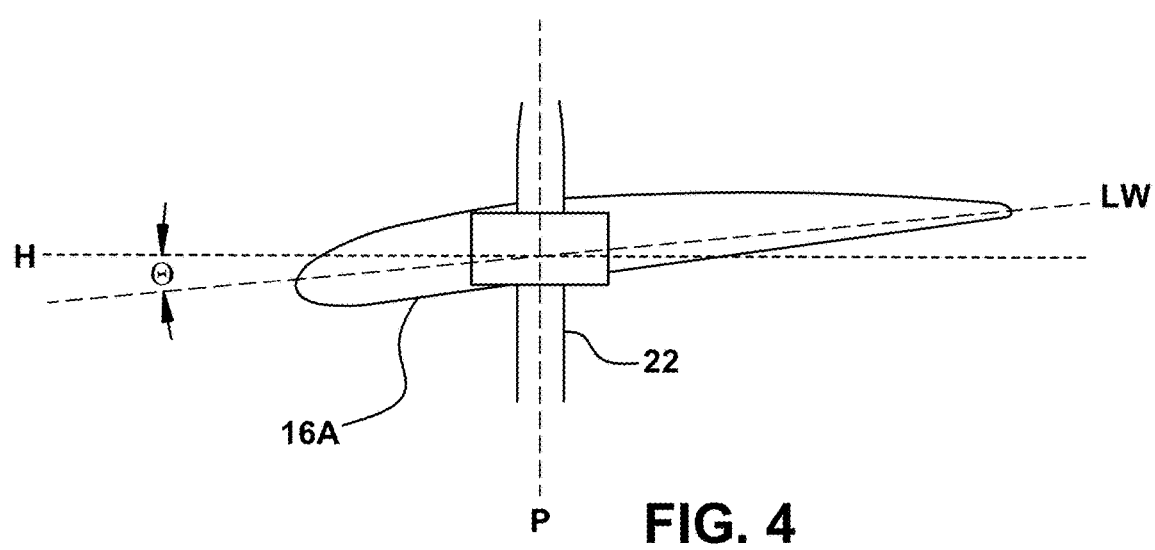
FIG. 4 is a side view of the wing illustrated in FIG. 3.

FIG. 3 is a perspective view of a wing 16A configured in accordance with an example embodiment. FIG. 4 is a side view of the wing 16A illustrated in FIG. 3. Those skilled in the art should readily appreciate that although wing 16A was employed for this example, wing 16B can be similarly configured. In the illustrated example, wing 16A has a longitudinal axis illustrated by line LW (when viewed from the side, this axis can be referred to as the chord axis), where line LW is not a part of wing 16A. At the root 22 of the wing 16A is a mounting hole 24 that where the pivot 20 (FIG. 2) passes through. The axis of the pivot is indicated by line P. The horizontal axis H is orthogonal to axis P. The root 22 is coupled with the wing 16A that causes a wing angle Θ between the axis H that is orthogonal to the pivot axis P and the wing's 16A longitudinal axis LW. The angle Θ changes the angle of attack for the wing 16A. In an example embodiment, the Applicant has employed an angle φ for the pivot of 16 degrees and a wing angle Θ of negative 7 degrees provides satisfactory maneuvering performance.

Figure 5:
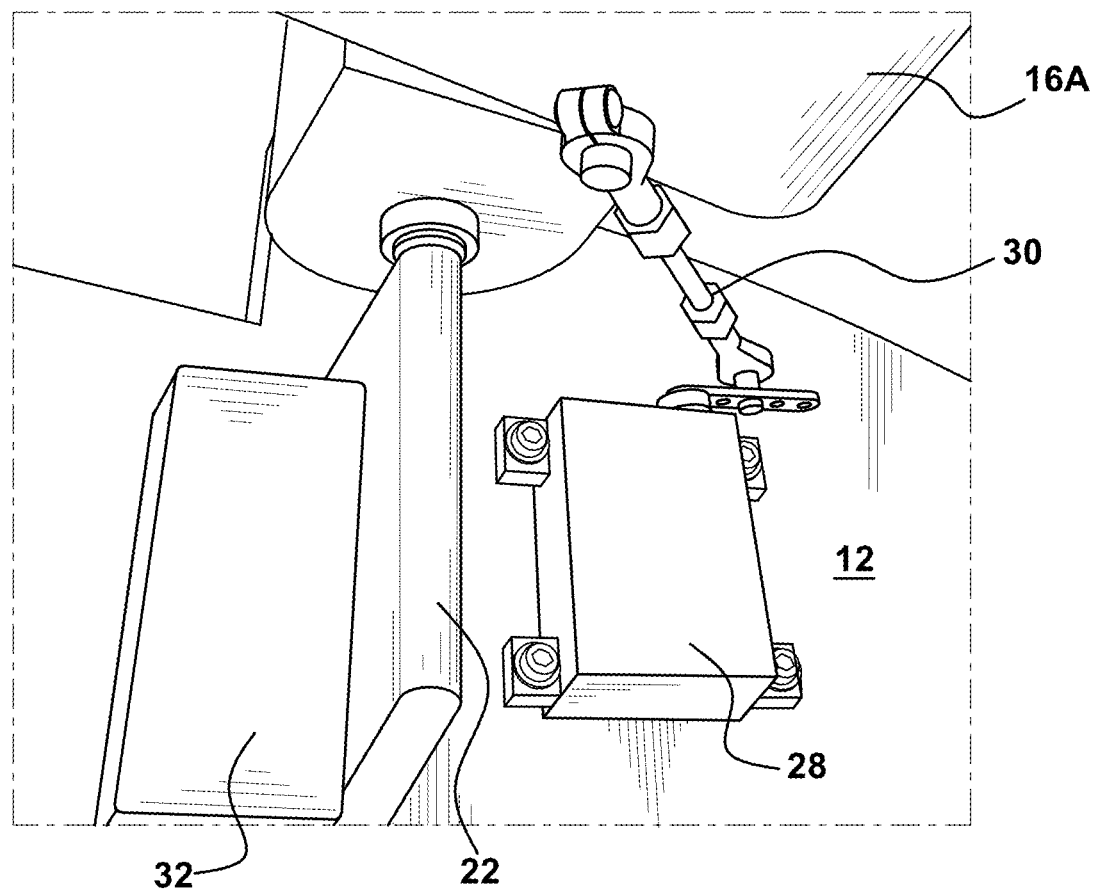
FIG. 5 is a perspective view underneath a wing of an example embodiment.
Figure 6:
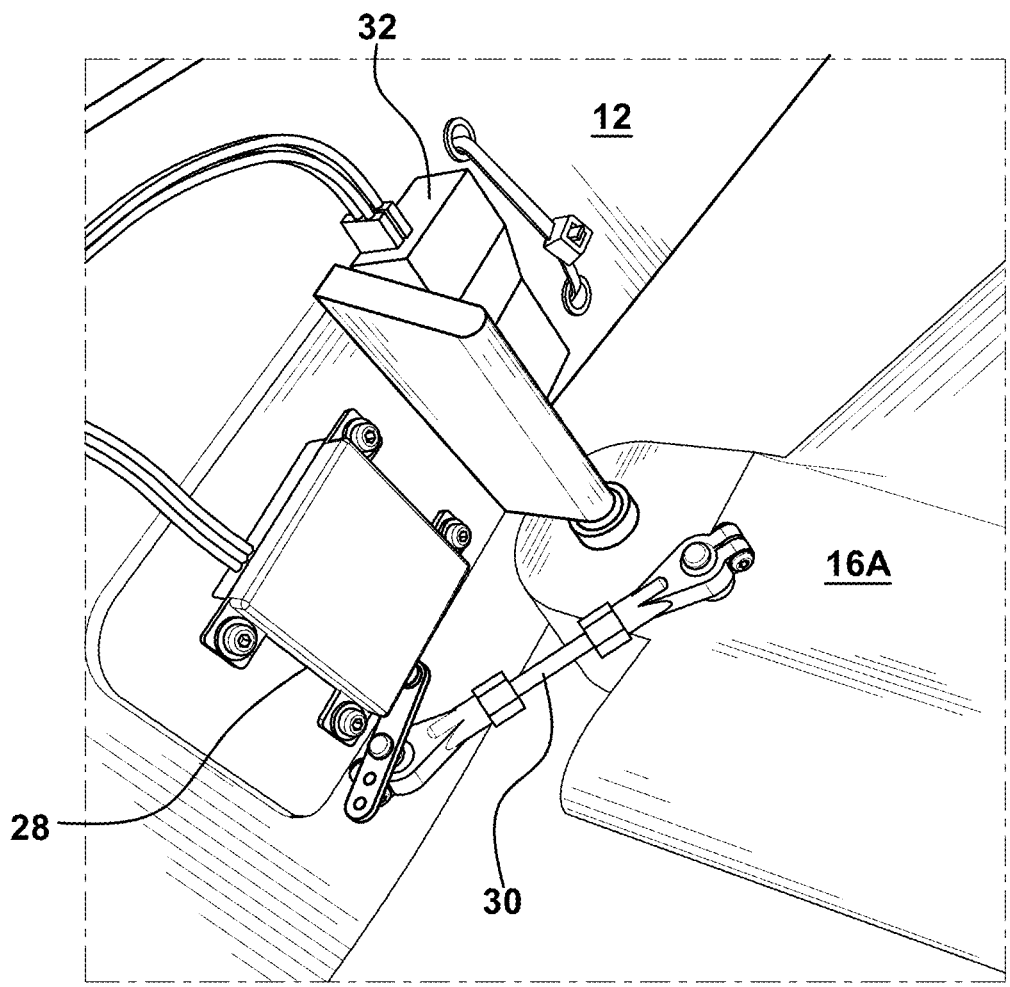
FIG. 6 is a bottom view underneath the wing illustrated in FIG. 5.

FIG. 5 is a perspective view underneath wing 16A of an example embodiment. A servo motor 28 is located underneath the wing 16A. In particular embodiments, the servo motor 28 is coupled with wing 16A by a control arm 30. In other embodiments, the motor may be located on the pivot axis P or inside the wing 16A. In particular embodiments, receiver 32 is coupled to the servo motor 28. The receiver 32 is operable to receive control inputs from a remote source, for example a wireless transmitter, and to cause the servo motor 28 to move the wing 16A in accordance with a control input. FIG. 6 is a bottom view underneath the wing illustrated in FIG. 5.

Figure 7:
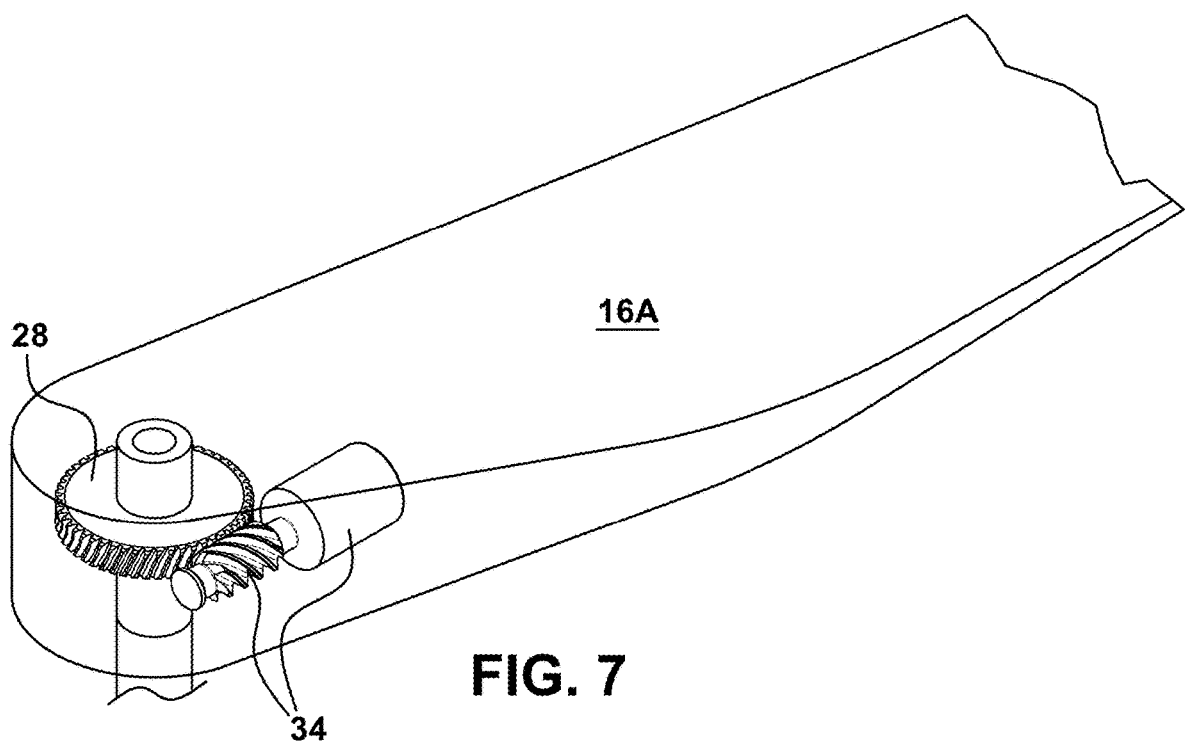
FIG. 7 illustrates an example of a servo motor located inside a wing.

FIG. 7 illustrates an example of a servo motor 28 located inside a wing 16A. The shaft of the servo motor can be located along the pivot axis P, or as illustrated can employ gears 34 to cause rotation of wing 16A.

Figure 8:
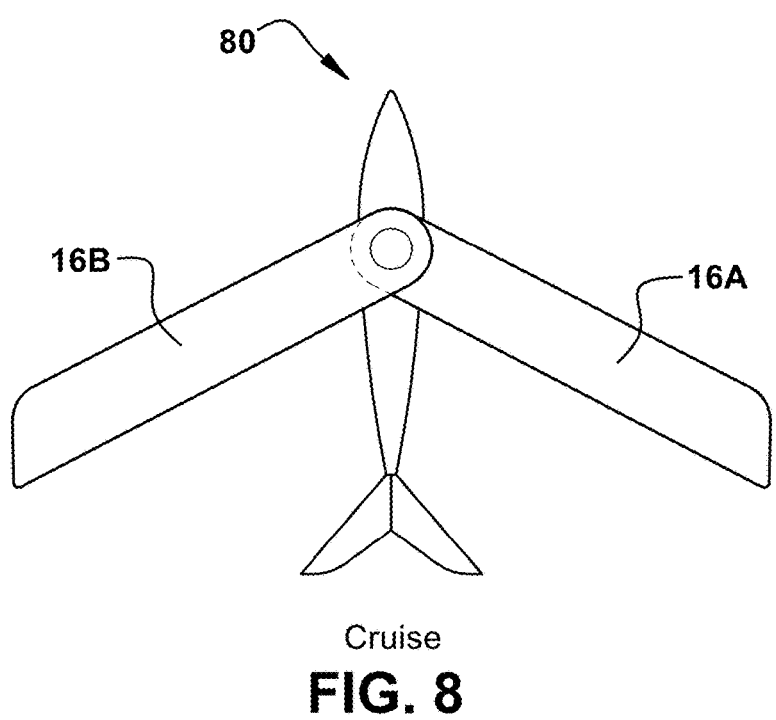
FIG. 8 illustrates an example of a wing configuration for level, straight flight.

FIG. 8 illustrates an example of a wing configuration 80 for level, straight flight. This configuration 80 may also be referred to as the cruising configuration. The angle of the wings for cruising was selected merely for ease of illustration as those skilled in the art can appreciate exact angle of the wing configuration may vary.

Figure 9:
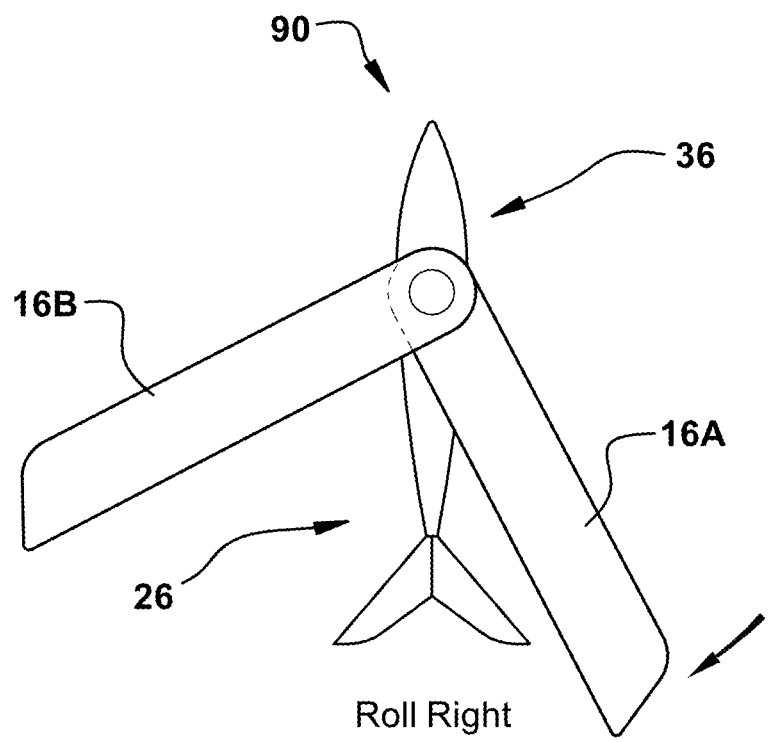
FIG. 9 illustrates an example wing configuration for rolling and/or turning right.

FIG. 9 illustrates an example wing configuration 90 for rolling and/or turning right. In this configuration 90, left wing 16B is rotated (or swept) forward towards the front 36 and the right wing 16A is rotated (or swept) towards the rear 26.

Figure 10:
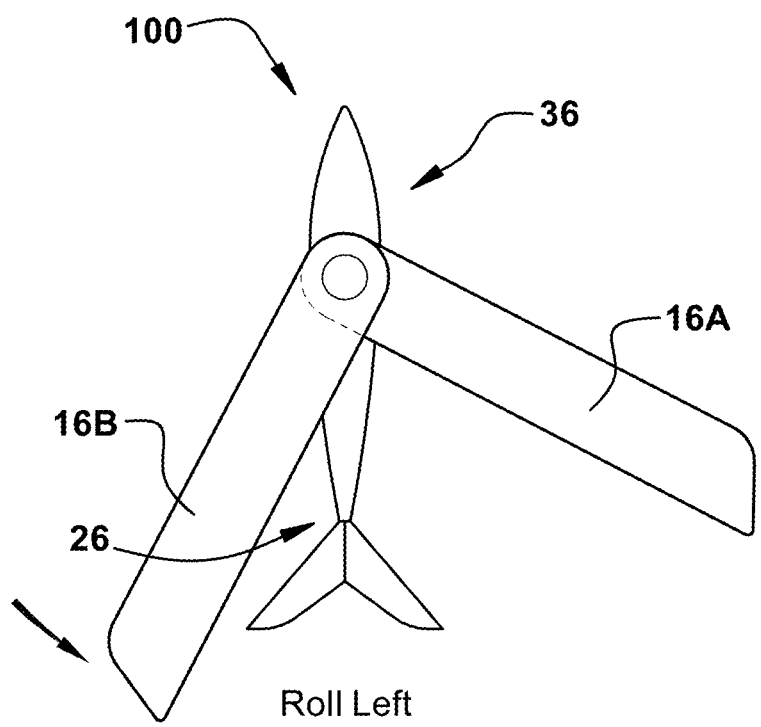
FIG. 10 illustrates an example wing configuration for rolling and/or turning left.

FIG. 10 illustrates an example wing configuration 100 for rolling and/or turning left. In this configuration 100, left wing 16B is rotated (or swept) rearward towards the rear 26 and the right wing 16A is rotated (or swept) towards the front 36.

Figure 11:
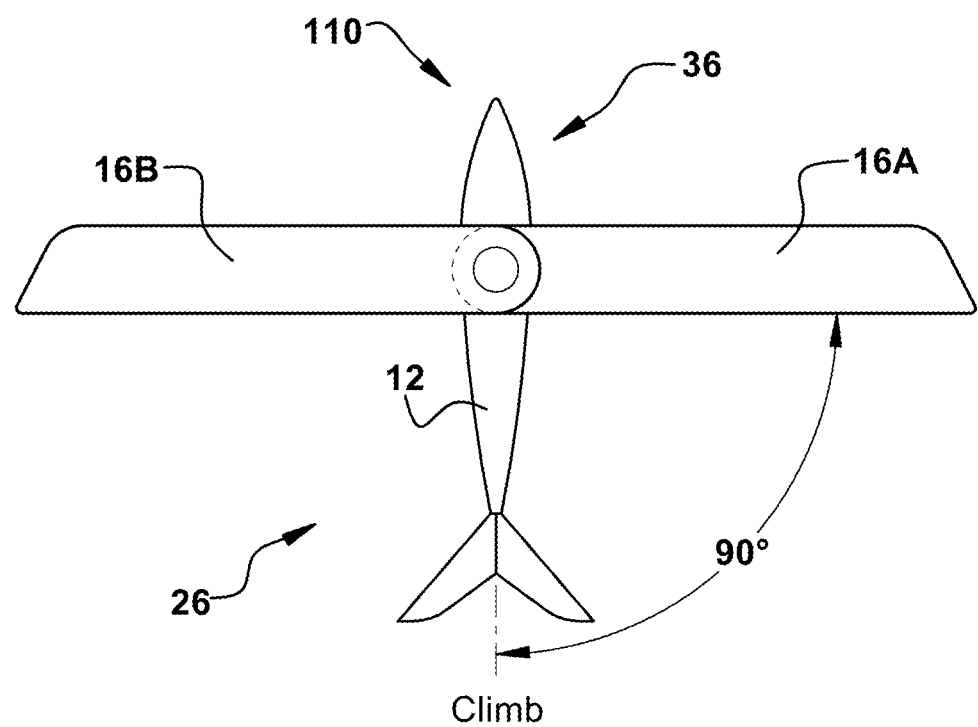
FIG. 11 illustrates an example wing configuration for pitching the aircraft up.

FIG. 11 illustrates an example wing configuration 110 for pitching the aircraft up, causing the aircraft to climb. In this configuration 110, both wings 16A, 16B are rotated (or swept) towards the front 36. In the illustrated example, the wings are perpendicular from the frame 12.

Figure 12:
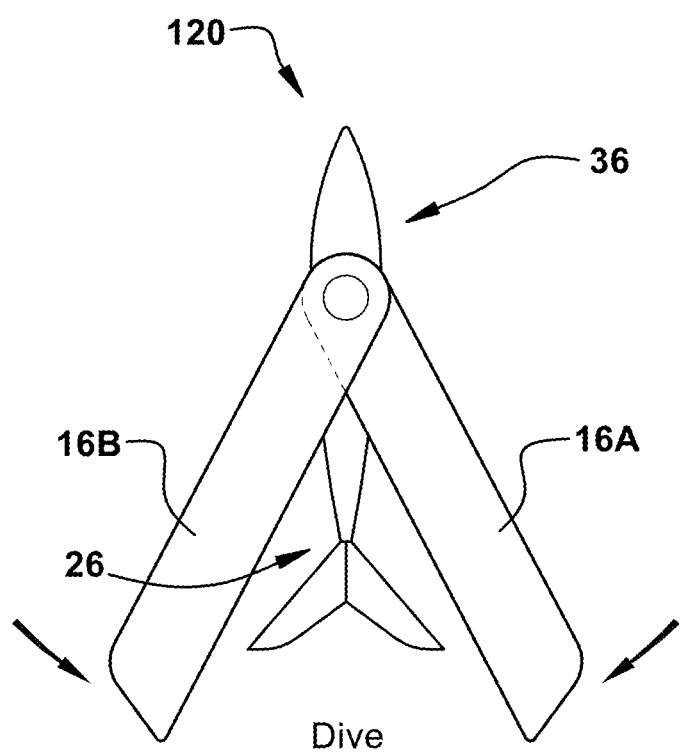
FIG. 12 illustrates an example wing configuration for pitching the aircraft down.

FIG. 12 illustrates an example wing configuration 10 for pitching the aircraft down or diving. In this configuration, both wings 16A, 16B are rotated (or swept) towards the rear 26 of the aircraft.

Figure 13:
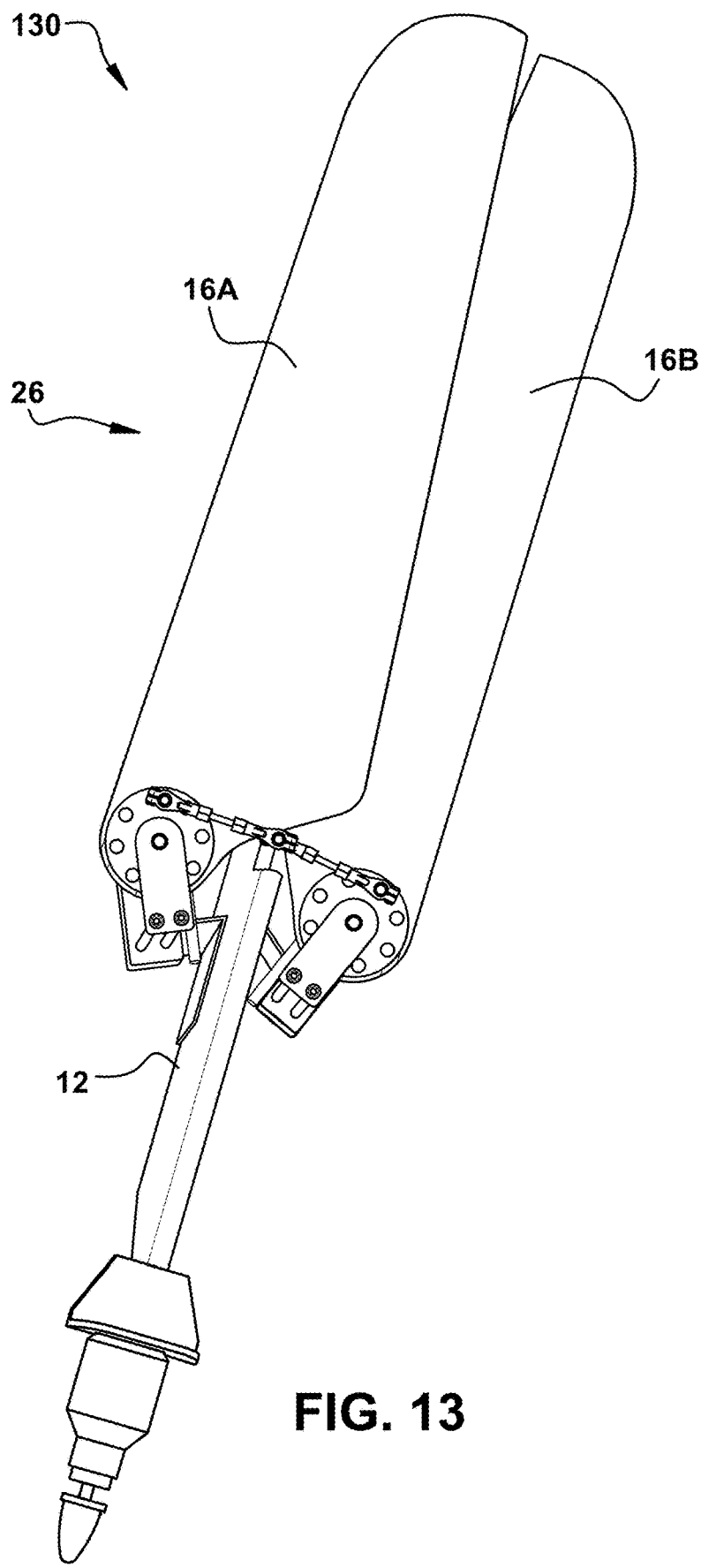
FIG. 13 illustrates an example configuration 130 where the wings are swept to the rear for storage or pre-deployment.

FIG. 13 illustrates an example configuration 130 where the wings are swept to the rear 26. This configuration 130 can be useful for storing or pre-deployment of the aircraft. In particular embodiments, the tailplanes 18 can be folded together for storage or pre-deployment.

Figure 14:
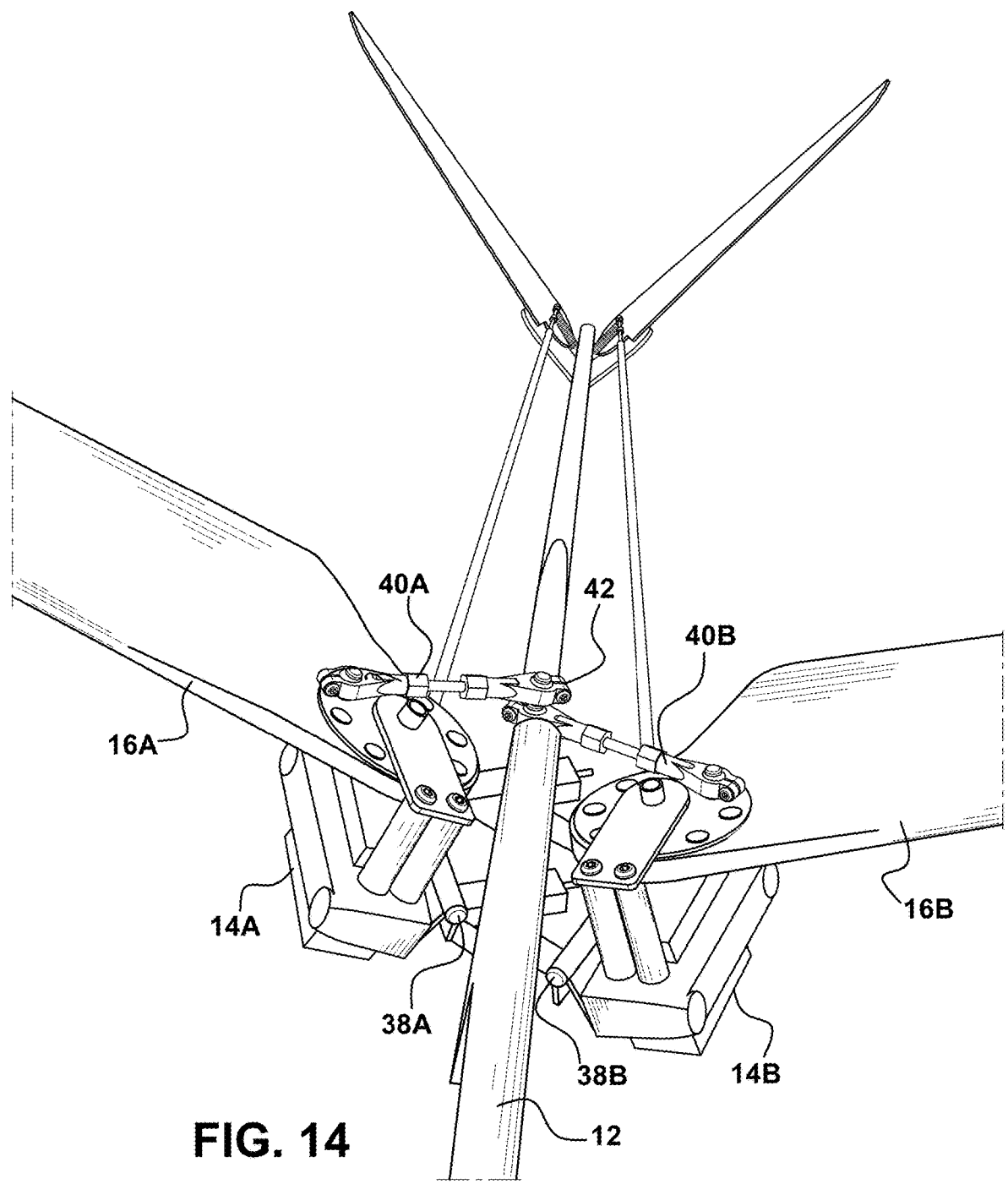
FIG. 14 illustrates an example of a dual axis wing movement where Angle of Attack and dihedral/anhedral angle are linked to the sweep position of the wings.

FIG. 14 illustrates an example of a dual axis wing movement where Angle of Attack and dihedral/anhedral angle are linked to the sweep position of the wings. The right protuberance 14A is coupled to a dihedral hinge 38A that is coupled with the frame 12. The left protuberance 14B is coupled with the left dihedral hinge 38B. As will be further illustrated in FIG. 15, the dihedral hinges 38A, 38B are offset from the frame at an angle. The dihedral offset angles for hinges 38A, 38B can be the same or different. Right link 40A is coupled with the right wing 16A and the frame 12 at a mounting point 42 on frame 12. A left link 40B is coupled with the left wing 16 and the frame 12. In the illustrated example, links 40A, 40B are coupled with the frame at the same mounting point 42, however, those skilled in the art should readily appreciate that links 40A, 40B can be coupled to the frame at different mounting points. As the wings are moved (e.g., rotated or swept), they rotate around the axis of the pivot and around the axis of the dihedral hinges 38A, 38B (dual axis).

Figure 15:
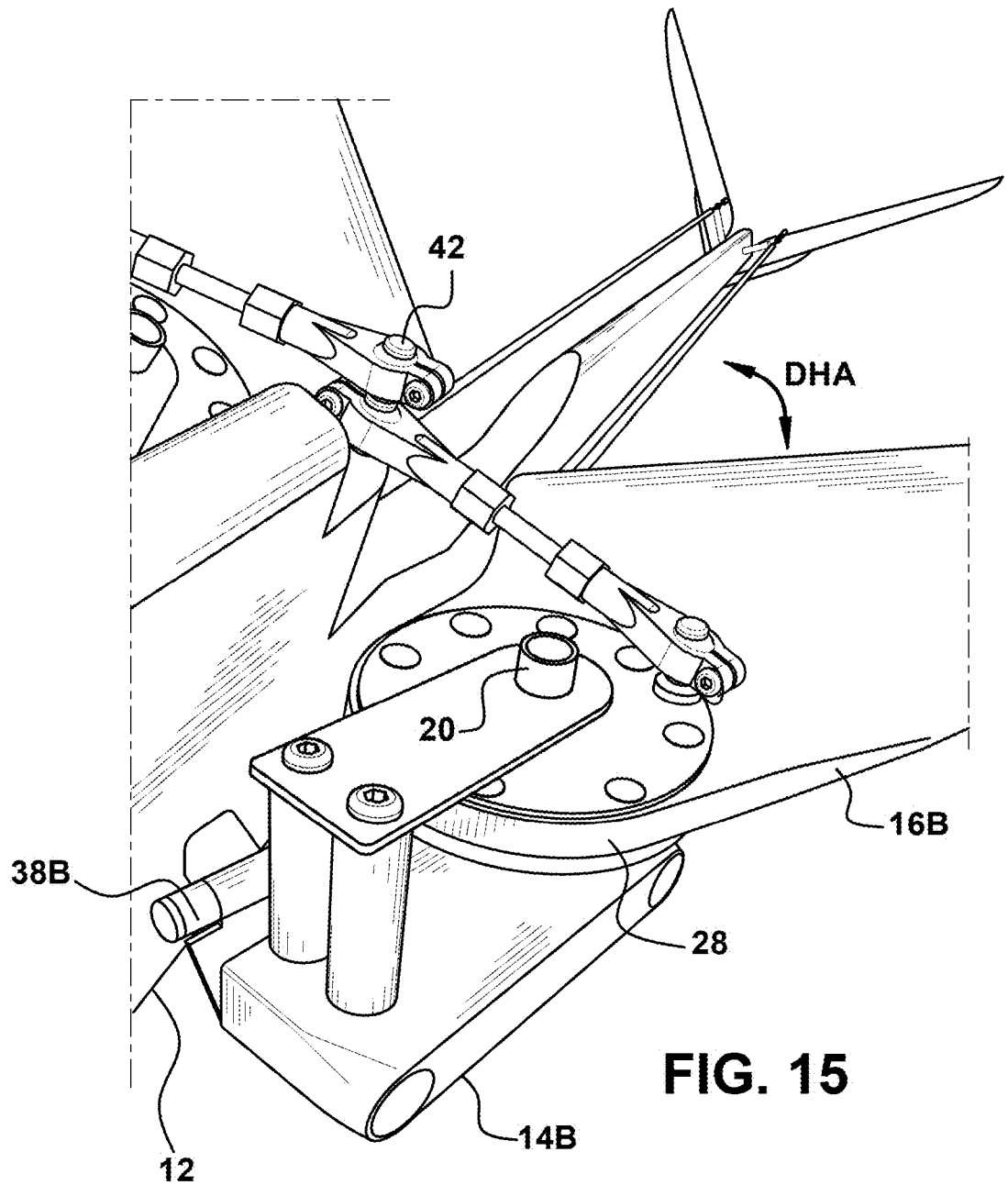
FIG. 15 illustrates an example of a wing pivot with a dihedral hinge.

FIG. 15 illustrates an example of a wing pivot 20 with a dihedral hinge 38B and link 40B is a sinusoidal crank link. In the illustrated example, the servo motor 28 is a direct servo drive. The hinge 38B is offset from the frame 12 at an angle indicated by DHA. The applicant has observed that a dihedral offset angle (DHA) of 30 degrees provides satisfactory performance, although other angles should be acceptable. As the wing 16B is rotated (or swept) forward, the angle of attack and dihedral angle increase. As the wing 16B is rotated (or swept) backwards, the dihedral angle and angle of attack decrease. Although the illustrated example describes the left protuberance 14B, the right protuberance 14A is configured similarly to the left protuberance 14B.

Figure 16:
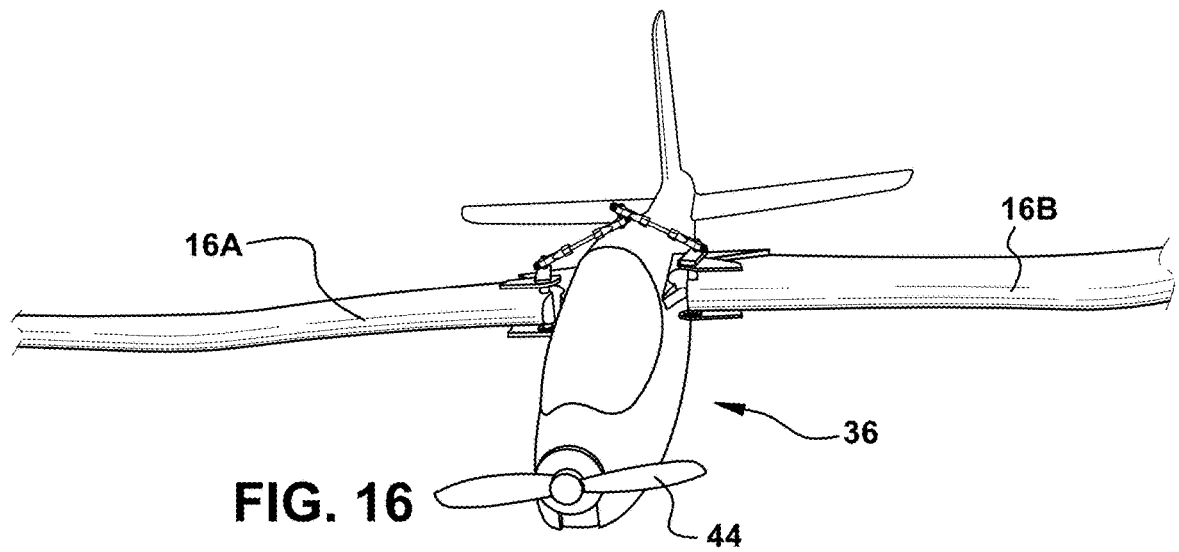
FIG. 16 illustrates an example of an aircraft configured as illustrated in FIG. 14 with the wings swept backward resulting in a negative dihedral (anhedral) angle and reduced angle of attack.
Figure 17:
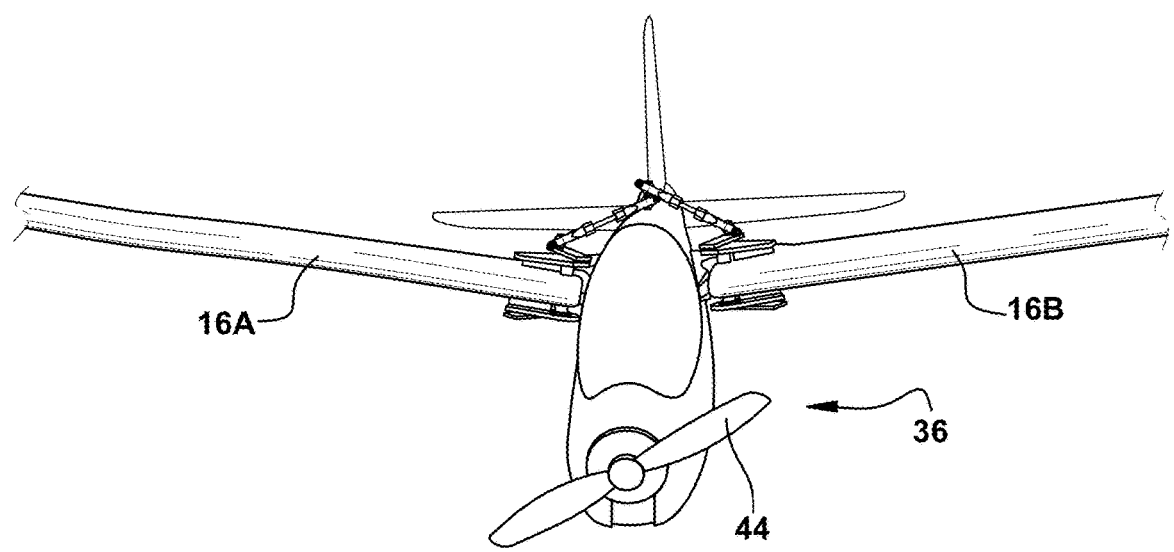
FIG. 17 illustrates an example of an aircraft configured as illustrated in FIG. 14 with the wings swept forward resulting in an increased anhedral angle and increased angle of attack.
Figure 18:
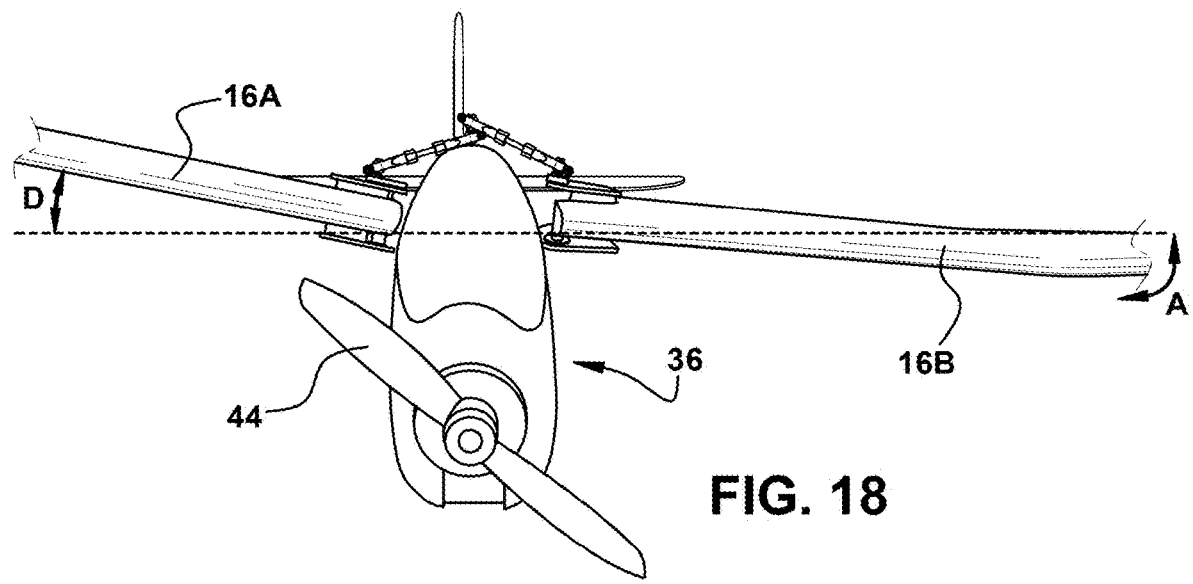
FIG. 18 illustrates an example of an aircraft configured as illustrated in FIG. 14 with one wring swept forward for an increased dihedral angle and angle of attack and the other wring swept back resulting in an anhedral angle and a decreased angle of attack/

FIG. 16 illustrates an example of an aircraft configured as illustrated in FIG. 14 with the wings 16A, 16B swept backward resulting in a negative dihedral (anhedral) angle and reduced angle of attack. FIG. 17 illustrates an example of an aircraft configured as illustrated in FIG. 14 with the wings 16A, 16B swept forward resulting in an increased anhedral angle and increased angle of attack. The examples illustrated in FIGS. 16 and 17 further comprise a propeller 44 at the front 36 of the aircraft, although in other embodiments the propeller 44 may be located somewhere else such as at the rear 26 of the aircraft. FIG. 18 illustrates an example of an aircraft configured as illustrated in FIG. 14 with one wring 16A swept forward for an increased dihedral angle (D) and angle of attack and the other wring 16B swept back resulting in an anhedral angle (A) and a decreased angle of attack.

Figure 19:
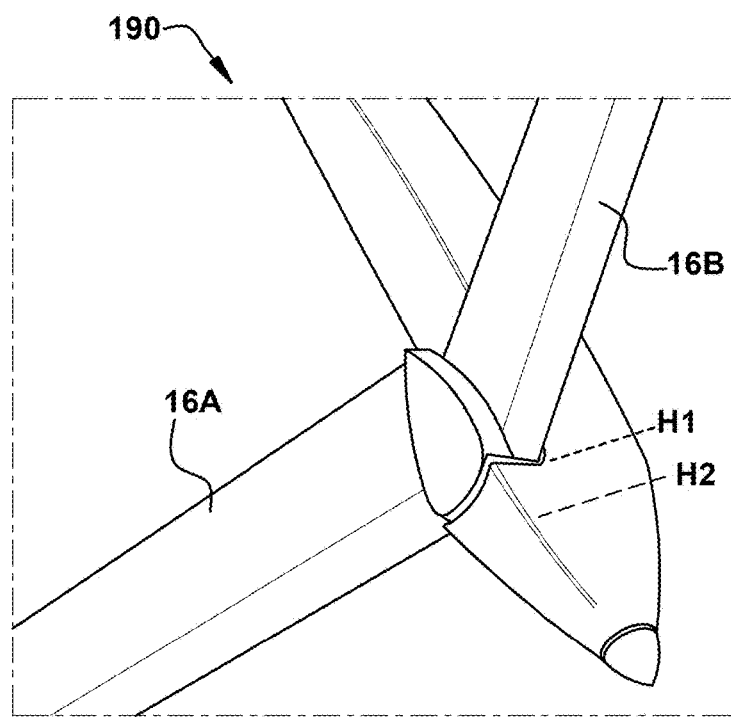
FIG. 19 illustrates an example of an aircraft with wings at different heights to facilitate folding rearwards.

FIG. 19 illustrates an example of an aircraft configuration 190 with wings 16A, 16B at different heights H1, H2 to facilitate folding rearwards. When the wings 16A and 16B in this example are folded back wing 16A will be over wing 16B.

Figure 20:
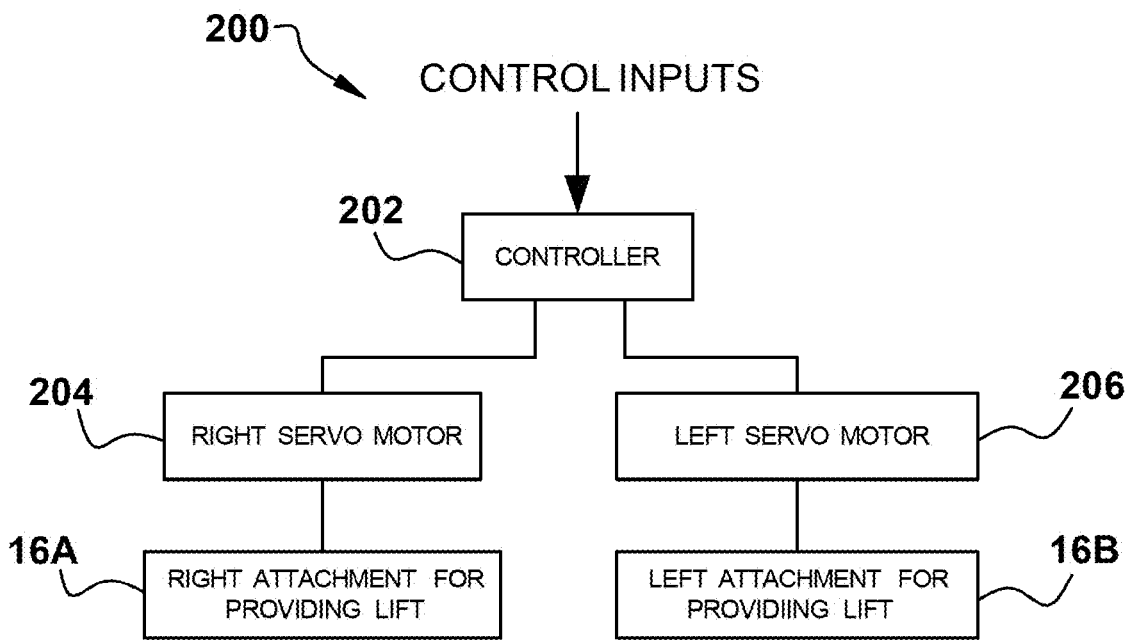
FIG. 20 illustrates an example of a control system for implementing an example embodiment.

FIG. 20 illustrates an example of a control system 200 for implementing an example embodiment. The control system 200 comprises a controller 202 that comprises logic for implementing the functionality described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/ programmed logic device, memory device containing instructions, or the like, or combinational logic embodied in hardware. Logic may also be fully implemented in software that is embodied on a tangible, non-transitory computer-readable medium that performs the described functionality when executed by one or more processors.

The controller 202 receives control inputs (CONTROL INPUTS) for maneuvering the vehicle. The control inputs can be from a user interface coupled with the controller (e.g., a manned vehicle) or from a remote source (e.g., an unmanned vehicle). Based on the control inputs (e.g., climb, dive, roll or turn right or left), the controller determines the appropriate configuration for the attachments for providing lift (e.g., airfoils, wings, hydrofoils, etc.) for performing the desired function. For example, the controller 202 can determine whether to move an airfoil forward or backward to increase or decrease an angle or attack and/or dihedral and anhedral angle respectively.

The controller 202 controls each attachment (e.g., airfoil) interpedently. The controller sends a command to right servo motor 204 (which can be the same type of servo motor as servo motor 28) to move the right attachment for providing lift (e.g., airfoil) 16A to a desired position to perform the maneuver requested in the control input. The controller 202 sends a command to left servo motor 206 (which can be the same type of servo motor as servo motor 28) to move the left attachment for providing lift (e.g., airfoil) 16B to a desired position to perform the maneuver requested in the control input2.

Figure 21:
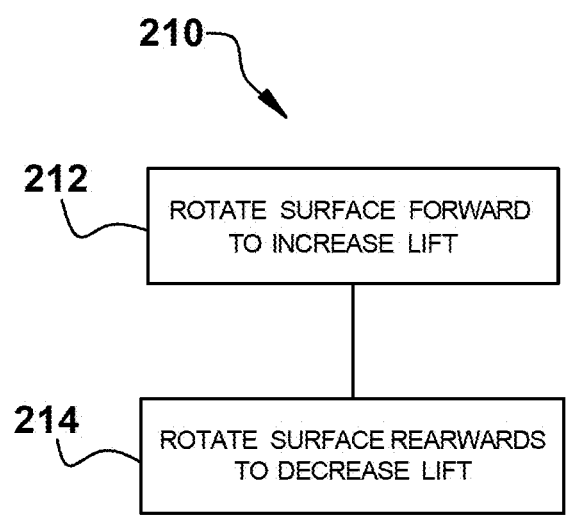
FIG. 21 illustrates a methodology upon which an example embodiment can be implemented.

In view of the foregoing structural and functional features described above, a methodology 210 in accordance with an example embodiment will be better appreciated with reference to FIG. 21. While, for purposes of simplicity of explanation, the methodology 210 of FIG. 21 is shown and described as executing serially, it is to be understood and appreciated that the example embodiment is not limited by the illustrated order, as some aspects could occur in different orders and/or concurrently with other aspects from that shown and described herein. Moreover, in an example embodiment, not all illustrated features may be required. The methodology 210 described herein is suitably adapted to be implemented in logic, such as hardware, software stored on a computer readable medium when executed by a processor, or a combination thereof.

The method 210 can be performed simultaneously or concurrently with multiple surfaces to maneuver a vehicle (such as an aircraft, watercraft, or munitions). In an example embodiment, the surface that provides lift for the vehicle is rotated about a pivot that is offset from a perpendicular axis of the vehicle. Controlling the lift of multiple surfaces by rotating them can be employed to change the roll, pitch, and yaw of a vehicle.

At 212, the surface is rotated (or swept) forward to increase the angle of attack. This can also cause the center of lift of the surface and the center of gravity of the vehicle to move.

At 214, the surface is rotated (or swept) rearward to decrease the angle of attack. This can also cause the center of lift of the surface and the center of gravity of the vehicle to move.

Figure 22:
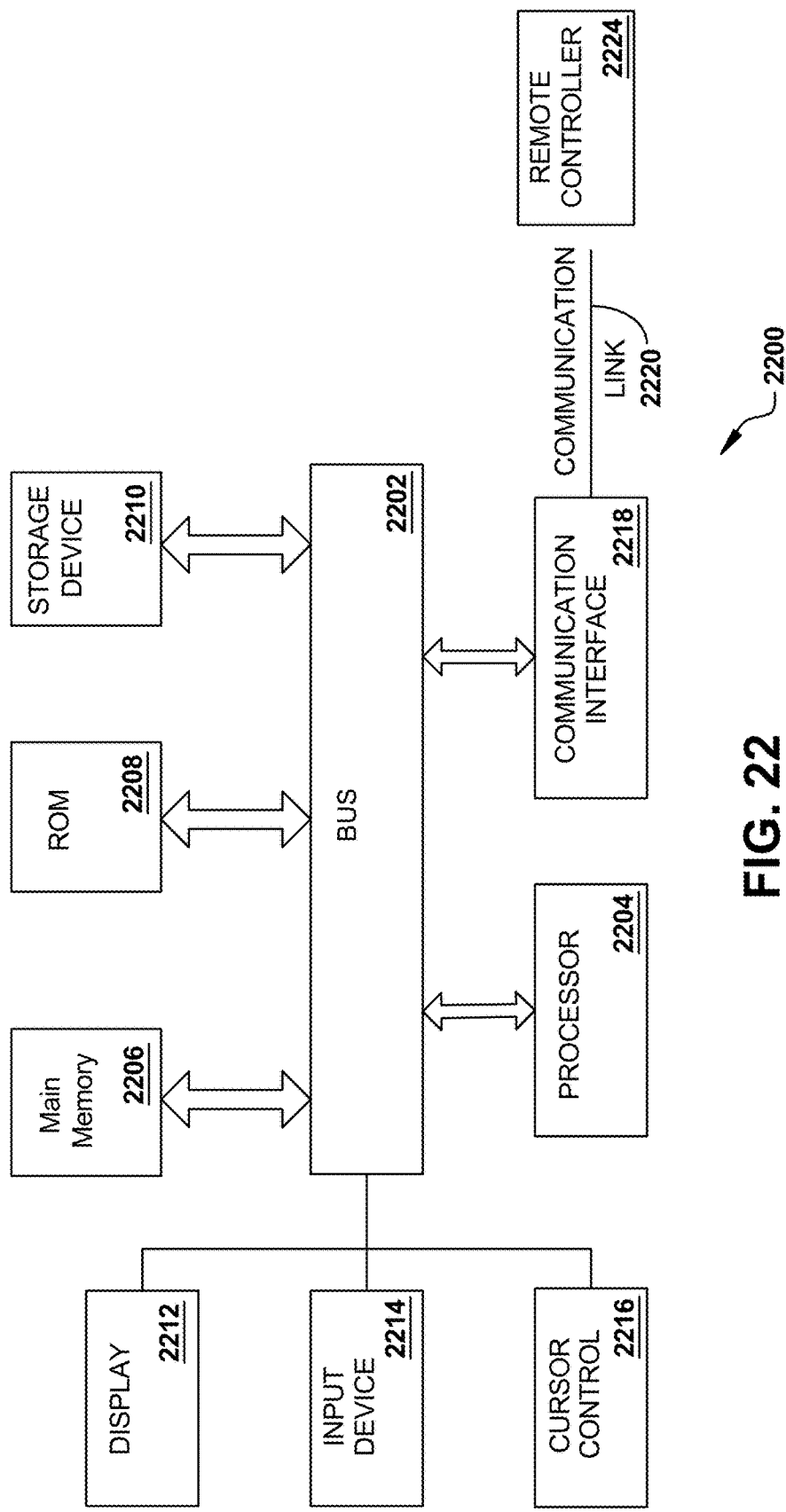
FIG. 22 illustrates an example of a computer system upon which an example embodiment can be implemented.

FIG. 22 is a block diagram that illustrates a computer system 2200 upon which an example embodiment may be implemented. Computer system 2200 can be employed to implement the functionality of controller 202 described in FIG. 20 and/or methodology 210 described in FIG. 21 as well as provide commands to cause surfaces or attachments 16A, 16B (FIG. 1) for providing lift (such as airfoils, wings, and hydrofoils) to move in accordance with the example embodiments described herein.

Computer system 2200 includes a bus 2202 or other communication mechanism for communicating information and a processor 2204 coupled with bus 2202 for processing information. Computer system 2200 also includes a main memory 2206, such as random access memory (RAM) or other dynamic storage device coupled to bus 2202 for storing information and instructions to be executed by processor 2204. Main memory 2206 also may be used for storing a temporary variable or other intermediate information during execution of instructions to be executed by processor 2204. Computer system 2200 further includes a read only memory (ROM) 2208 or other static storage device coupled to bus 2202 for storing static information and instructions for processor 2204. A storage device 2210, such as a magnetic disk or optical disk, is provided and coupled to bus 2202 for storing information and instructions.

Computer system 2200 may be coupled via bus 2202 to a display 2212 such as a cathode ray tube (CRT) or liquid crystal display (LCD), for displaying information to a computer user. An input device 2214, such as a keyboard including alphanumeric keyboard is coupled to bus 2202 for communicating information and command selections to processor 2204. Another type of user input device is cursor control 2216, such as a mouse, a trackball, or cursor direction keys, a joystick, yolk, or rudder pedals for communicating direction information and command selections to processor 2204 and for controlling cursor movement on display 2212.

An aspect of an example embodiment is related to the use of computer system 2200 for an aircraft or vehicle control system. According to one embodiment, an aircraft or vehicle control system 2200 is provided by computer system 2200 in response to processor 2204 executing one or more sequences of one or more instructions contained in main memory 2206. Such instructions may be read into main memory 2206 from another computer-readable medium, such as storage device 2210. Execution of the sequence of instructions contained in main memory 2206 causes processor 2204 to perform the process steps described herein. One or more processors in a multi-processing arrangement may also be employed to execute the sequences of instructions contained in main memory 2206. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any tangible, non-volatile medium that participates in providing instructions to processor 2204 for execution. Non-volatile media include for example optical or magnetic disks, such as storage device 2210. Common forms of computer-readable media include for example RAM, PROM, EPROM, FLASHPROM, CD, DVD, SSD or any other memory chip or cartridge, or other medium from which a computer can read.

Computer system 2200 also includes a communication interface 2218 coupled to bus 2202. Communication interface 2218 provides a two-way data communication coupling to a communication link 2220 that is connected to a remote controller 2224. In an example embodiment, communication link 2220 is a wireless link. However, a combination of wired and wireless links may be employed for the remote controller 2224 to provide control signals to computer system 2200.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
   a aircraft;
   a pivot mounted on a side of the aircraft with a pivot offset along a longitudinal axis at a non-zero angle from a vertical axis of the aircraft; and
   an airfoil that comprises a root that is rotatably mounted on the pivot, wherein rotation of the airfoil about the pivot causes a change in an angle of attack and lift of the airfoil.

2. The apparatus set forth in claim 1, wherein the root is offset from a longitudinal axis of the airfoil by a non-zero angle.

3. The apparatus set forth in claim 2, further comprising tailplanes coupled with the aircraft.

4. The apparatus set forth in claim 2, further comprising a motor coupled with the airfoil and operable to cause the airfoil to rotate about the pivot.

5. The apparatus set forth in claim 4, further comprising a control arm coupling the motor with the airfoil.

6. The apparatus set forth in claim 2, further comprising a propeller coupled with the aircraft, propeller that provides fluid flow to the wing.

7. The apparatus set forth in claim 2, further comprising:
   a second pivot mounted on a second side of the aircraft with a second pivot offset along the longitudinal axis at a non-zero angle from the vertical axis of the aircraft; and
   a second airfoil that comprises a second root that is rotatably mounted on the second pivot, wherein rotation of the second airfoil about the second pivot causes a change in a second angle of attack and a second lift of second the airfoil.

8. The apparatus of claim 7, further comprising:
   a first servo motor coupled with the first airfoil that is operable to cause the first airfoil to rotate about the first pivot;
   a second servo motor coupled with the second airfoil that is operable to cause the second airfoil to rotate about the second pivot; and
   a controller operable to receive control inputs for maneuvering the aircraft;
   wherein the controller is operable to control the first and second servo motors to cause the first and second airfoils to rotate independently.

9. The apparatus set forth in claim 8, wherein the controller causes a selected one of the first and second airfoils sweep towards the rear of the aircraft while the other airfoil remains stationary to cause a roll.

10. The apparatus set forth in claim 8, wherein the controller is operable to cause a selected one of the first airfoil and second airfoil to sweep forward and an other of the first and second airfoils to sweep rearward to cause a turn.

11. The apparatus set forth in claim 8, where the controller is operable to cause both airfoils to sweep forward to climb.

12. The apparatus set forth in claim 8, wherein the controller is operable to cause both airfoils to sweep rearwards to dive.

13. The apparatus set forth in claim 8, wherein for the first and second airfoils, the pivot offsets are at an angle 16 degrees and the root is offsets from the longitudinal axis of the airfoil at an angle of negative 7 degrees.

14. The apparatus set forth in claim 7, wherein the airfoils are configured to fold along the aircraft.

15. The apparatus set forth in claim 14, wherein the tailplanes are configured to fold together.

16. The apparatus set forth in claim 7, further comprising:
a first dihedral hinge coupled with the aircraft at a first dihedral hinge offset;
a first servo motor coupled with the first dihedral hinge and coupled with the first airfoil the first servo motor is operable to cause the first airfoil to rotate about the first pivot;
a second dihedral hinge coupled with the aircraft at a second dihedral hinge offset;
a second servo motor coupled with the second dihedral hinge and coupled with the second airfoil, the second servo motor is operable to cause the second airfoil to rotate about the second pivot;
a first link coupled with the aircraft and the first airfoil; and
a second link coupled with the aircraft and the second airfoil.

17. The apparatus set forth in claim 16, further comprising:
a controller operable to receive control inputs for maneuvering the aircraft;
wherein the controller is operable to control the first and second servo motors to cause the first and second airfoils to rotate independently.

18. The apparatus set forth in claim 17, wherein the dihedral hinges are offset from the aircraft by thirty degrees.

19. The apparatus set forth in claim 7, wherein the first airfoil and second airfoil are coupled with the aircraft at different heights and configured to allow the airfoils to fold over each other in the fully rearward position.

20. A method comprising:
rotating first airfoil configured to provide lift to a aircraft along an axis that is offset from a perpendicular axis along a longitudinal axis of the aircraft to vary an angle of attack for the first airfoil;
rotating second airfoil configured to provide lift to a aircraft along the axis that is offset along the longitudinal axis from the perpendicular axis of the aircraft to vary an angle of attack for the second airfoil; and
wherein the first and second airfoils are rotated independently to control roll, pitch, and yaw of the aircraft.

* * * * *